(12) United States Patent
Kim (10) Patent No.: US 8,160,592 B2
(45) Date of Patent: Apr. 17, 2012

(54) DATA RELAY APPARATUS AND METHOD USING TELEPHONE NUMBER

(75) Inventor: Sun-Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 11/924,078

(22) Filed: Oct. 25, 2007

(65) Prior Publication Data
US 2008/0274743 A1    Nov. 6, 2008

(30) Foreign Application Priority Data

May 4, 2007  (KR) .................. 10-2007-0043648

(51) Int. Cl.
*H04N 7/173* (2011.01)
*H04N 7/16* (2011.01)
*H04W 40/00* (2009.01)

(52) U.S. Cl. .................. 455/445; 725/106; 725/117

(58) Field of Classification Search .......... 455/445, 455/566; 725/106, 117, 147, 10, 110, 112, 725/109
See application file for complete search history.

(56) References Cited

U.S. PATENT DOCUMENTS

| | | | |
|---|---|---|---|
| 7,499,704 B1 * | 3/2009 | Bonner ............. | 455/435.1 |
| 2004/0052341 A1 * | 3/2004 | Yeh et al. ............. | 379/88.19 |
| 2007/0115389 A1 * | 5/2007 | McCarthy et al. ............. | 348/461 |
| 2007/0250845 A1 * | 10/2007 | Walter et al. ............. | 725/10 |
| 2007/0250884 A1 * | 10/2007 | Qiu et al. ............. | 725/106 |
| 2008/0134267 A1 * | 6/2008 | Moghe et al. ............. | 725/112 |

FOREIGN PATENT DOCUMENTS

| | | |
|---|---|---|
| JP | 2002-359670 A | 12/2002 |
| KR | 10-2005-0052755 A | 6/2005 |
| KR | 10-2005-0073880 A | 7/2005 |
| KR | 10-2006-0083259 A | 7/2006 |
| KR | 10-2006-0106328 A | 10/2006 |
| KR | 10-2006-0122094 A | 11/2006 |

OTHER PUBLICATIONS

Office Action dated May 19, 2011 from the Korean Intellectual Property Office in counterpart Korean patent application No. 10-2007-0043648.

* cited by examiner

*Primary Examiner* — Blane J Jackson
(74) *Attorney, Agent, or Firm* — Sughrue Mion, PLLC (57) ABSTRACT

A data relay apparatus and method using a telephone number are provided. The data relay apparatus includes: a searching unit that searches for an IP address of a host apparatus corresponding to a receiver's telephone number received from a sender; and an output unit that outputs information transmitted from the sender to the host apparatus having the searched IP address.

23 Claims, 5 Drawing Sheets

DATA RELAY APPARATUS AND METHOD USING TELEPHONE NUMBER

CROSS REFERENCE TO RELATED APPLICATION

This application claims priority from Korean Patent Application No. 10-2007-0043648 filed on May 4, 2007 in the Korean Intellectual Property Office, the disclosure of which is incorporated herein by reference in its entirety.

BACKGROUND OF THE INVENTION

1. Field of the Invention

The present invention relates to a data relay apparatus and method, and more particularly, a data relay apparatus and method capable of transmitting contents, sender information, and receiver information to a host apparatus using a receiver's telephone number and an Internet Protocol (IP) address of the host apparatus.

2. Description of the Related Art

Mobile communication terminals can be connected to digital televisions (DTVs) by communication units, such as Universal Serial Bus (USB), IEEE 1394, and Bluetooth, and can record, store, and play back digital contents (hereinafter, referred to as "contents"). The contents include all kinds of information that can be displayed under the control of a user, such as moving pictures, sound/music/voice, and photographs. The mobile communication terminals may include personal digital assistants (PDAs), personal communication systems (PCSs), mobile phones, camcorders, personal video recorders (PVRs), digital cameras, and MP3 players. When a sender makes a phone call to a receiver, or transmits a text message thereto, the mobile communication terminal enables a sender's telephone number or the text message to be displayed on a TV screen.

Figure 1:
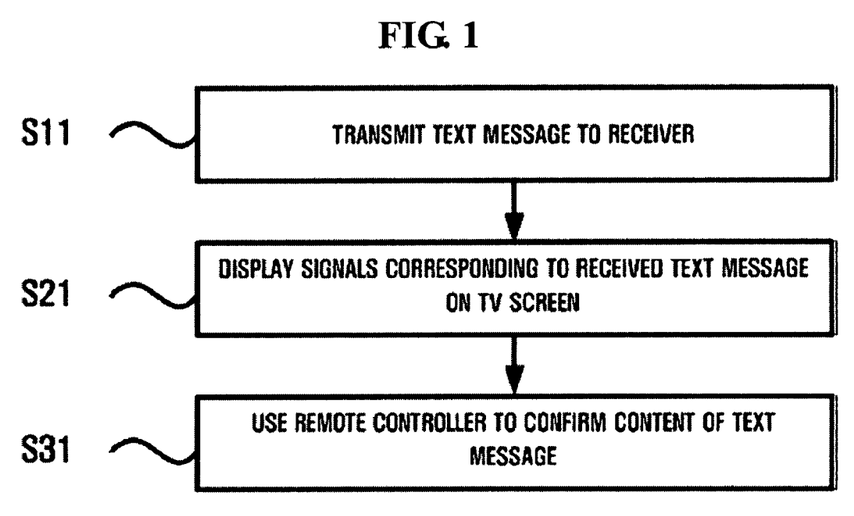
FIG. 1 is a conceptual diagram illustrating a process of transmitting a text message on a TV screen through a cellular phone according to the related art.

FIG. 1 is a conceptual diagram illustrating a process of transmitting a text message and displaying the text message on a TV screen through a cellular phone according to the related art.

A sender uses a cellular phone to make a phone call or to transmit a text message to a receiver (S11).

Then, the receiver who is watching TV receives information on the phone call or the text message through a cellular phone, and signals corresponding to information on the phone call or the text message are displayed on the TV screen through an interactive data communication technique (S21). The signals may be translucently displayed on a portion of the TV screen in an on-screen display (OSD) format.

When a notification indicating that the phone call is received is displayed on the TV screen, the receiver recognizes that the cellular phone has received the phone call, and can speak to the sender over the cellular phone.

If a test message notification indicating that a text message is received is displayed on the TV screen, the receiver pushes a message confirm button on a remote controller to enlarge the text message on the TV screen and checks the content of the text message (S31). The TV transmits a signal indicating that the receiver has confirmed the message to the cellular phone of the receiver, such that the cellular phone of the receiver cannot notify the receiver of the reception of the text message in the form of an notification sound or vibration.

However, when the cellular phone is turned off or the receiver does not have the cellular phone, the above-mentioned functions cannot be performed since signals for the phone call or the text message received from the cellular phone of the receiver are displayed on the TV screen. In addition, only the text message is displayed on the TV screen.

SUMMARY OF THE INVENTION

The present invention provides a data relay apparatus and method using a telephone number that can transmit various contents to a host apparatus using a receiver's telephone number and an IP address of the host apparatus.

According to an aspect of the invention, a data relay apparatus using a telephone number includes: a searching unit using a receiver's telephone number received from a sender to search an IP address of a host apparatus corresponding to the telephone number; and an output unit outputting information transmitted from the sender to the host apparatus having the searched IP address.

According to another aspect of the invention, a data relay method using a telephone number includes: using a receiver's telephone number received from a sender to search an IP address of a host apparatus corresponding to the telephone number; and outputting information transmitted from the sender to the host apparatus having the searched IP address.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Before describing exemplary embodiments of the invention, terms used in the specification will be described briefly for better comprehension of the exemplary embodiments of the invention. The terms used herein are for the purpose of describing particular exemplary embodiments only and are not intended to limit the invention.

An Internet Protocol Television (IPTV) provides an information service, moving picture contents, and broadcasting to a television set using high-speed Internet. The IPTV is a kind of digital convergence, from the viewpoint in which the Internet and a television are digitally combined with each other. The IPTV differs from the existing Internet TV in that a television is used instead of a computer monitor and a remote controller is used instead of a mouse. Only a television, a set-top box, and an Internet line are needed to use the IPTV. That is, in order to use the IPTV, a user connects a set-top box and a dedicated modem to the television, and turns on the apparatuses.

Figure 2:
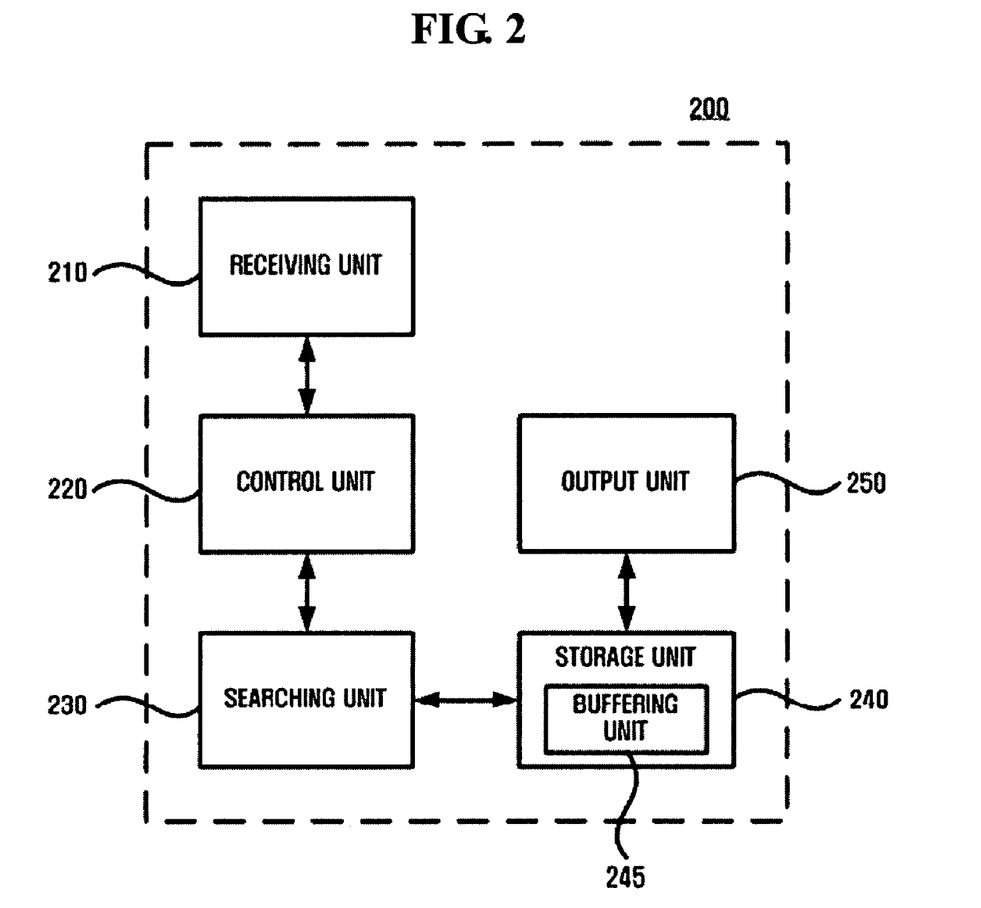
FIG. 2 is a block diagram illustrating a data relay apparatus using a telephone number according to an exemplary embodiment of the invention.

FIG. 2 is a block diagram illustrating a data relay apparatus using a telephone number according to an exemplary embodiment of the invention.

A data relay apparatus 200 using a telephone number includes a receiving unit 210, a control unit 220, a searching unit 230, a storage unit 240, and an output unit 250. The data delay apparatus 200 may be provided in a server of a base station, and store information of telephone subscribers in a database. The information of telephone subscribers may include a subscriber's name, a telephone number, and information on a host apparatus of the subscriber. The host apparatus is allocated with an IP address, and includes a module capable of displaying predetermined information (or data). For example, the module for displaying information may be provided with an image display unit capable of displaying input image signals, such as a cathode ray tube (CRT), a liquid crystal display (LCD), a light-emitting diode (LED), an organic light-emitting diode (OLED), or a plasma display panel (PDP).

The receiving unit 210 receives information from a transmitter side. For example, the receiving unit 210 may receive contents, sender information, and receiver information from a mobile communication terminal of the sender. The contents may include at least one of text, images, audio, and video. The receiver information may include a receiver's name and a telephone number of the receiver. The telephone number of the receiver may be a receiver's home telephone number including an area code, but the invention is not limited thereto.

The control unit 220 determines whether the area code included in the receiver's telephone number can be processed. For example, it is assumed that the data relay apparatus 200 can process only an area code "02" and cannot process an area code included in the received telephone number (for example, an area code "031"). In this case, the control unit 220 can transmit contents, sender information, and receiver information to a host data relay apparatus or another data relay apparatus capable of processing the area code. When the host data relay apparatus 200 cannot process the area code, it can retransmit the contents, sender information, and receiver information to another data relay apparatus 200 capable of processing the area code. When the area code can be processed, the searching unit 230, which will be described below, searches an IP address of a host apparatus corresponding to the telephone number.

The searching unit 230 searches an IP address of a host apparatus corresponding to a receiver's telephone number. The host apparatus is given an IP address which allows the host apparatus to communicate with the data relay apparatus 200 over a wire or wireless network, and it may be an IPTV.

The storage unit 240 stores the contents and a mapping table having telephone numbers and IP addresses mapped to each other. That is, the mapping table may include information shown in Table 1.

TABLE 1

| Area code | Telephone number | IP address |
|---|---|---|
| 02 | 153-1440 | 165.219.157.56 |
| 02 | 153-2740 | 165.219.157.75 |
| ... | ... | ... |

As shown in Table 1, a plurality of telephone numbers and IP addresses of the host apparatuses may be stored in the mapping table. The area codes included in the telephone numbers may be composed of independent fields in the mapping table. The data relay apparatus 200 according to this exemplary embodiment may be provided in a server of a base station, and the mapping table shown in FIG. 1 may be created by using telephone numbers of telephone subscribers and IP addresses of host apparatuses.

Therefore, the control unit 220 effectively determines whether area codes can be processed on the basis of the mapping table, and the searching unit 230 can search an IP address of a host apparatus corresponding to a receiver's telephone number that is received.

The storage unit 240 may include a buffering unit 245.

When information transmitted by a transmitter (for example, contents, receiver information, and sender information) is not transmitted to a host apparatus, the buffering unit 245 temporarily stores the information and attempts to retransmit the information according to a time to live (TTL). The control unit 220 controls the buffering unit 245 to retransmit information that the sender wants to transmit by a threshold value, and controls the output unit 250 to transmit the result to a sender's mobile communication terminal.

The output unit 250 outputs the information transmitted from the sender to a host apparatus having the searched IP address. For example, the output unit 250 may output at least one of the contents transmitted from the sender's mobile communication terminal, receiver information, and sender information to the host apparatus. In this case, the contents, the receiver information, and the sender information may be transmitted to the host apparatus through a transmission control protocol (TCP)/IP or a user datagram protocol (UDP). Alternatively, the data relay apparatus 200 may transmit the contents, the receiver information, and the sender information to the host apparatus through a wire or wireless network.

When a receiver's telephone number is not a general telephone number having an area code (for example, a telephone number starting from 010, 016, or 011), the data relay apparatus may search an IP address of a host apparatus corresponding to the received general telephone number using the above-mentioned principle, and transmit contents, receiver information, and sender information to the host apparatus having the searched IP address.

The components shown in FIG. 2 may be composed of "modules". The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined with fewer components and modules or further separated from additional components and modules.

Figure 3:
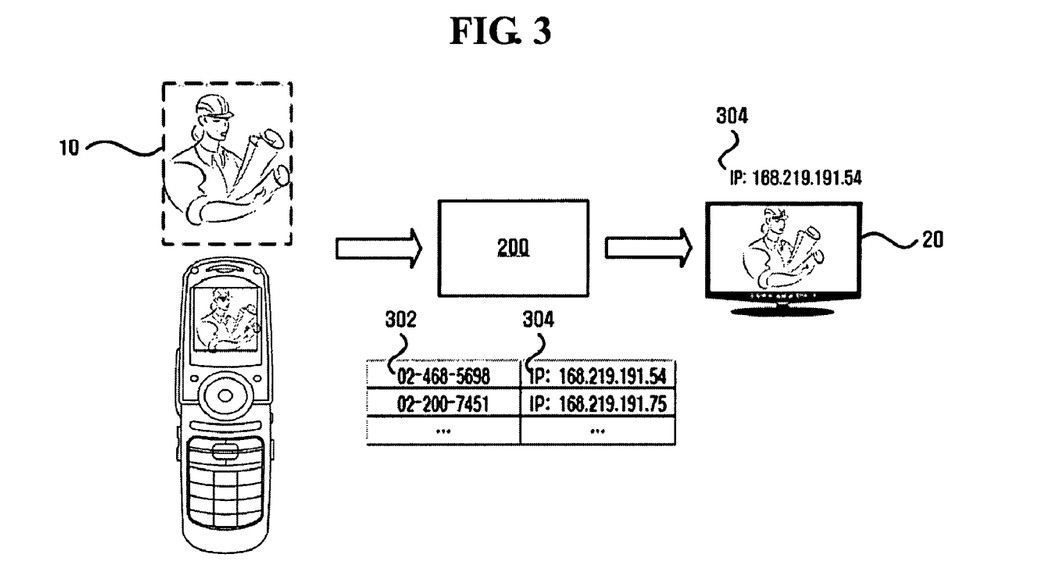
FIG. 3 is a conceptual diagram illustrating a process of transmitting contents to a host apparatus using a telephone number according to an exemplary embodiment of the invention.

FIG. 3 is a conceptual diagram illustrating a process of transmitting contents to a host apparatus using a telephone number.

A sender transmits information 10 including contents, sender information, and receiver information to the data relay apparatus 200 using a mobile communication terminal. The sender may transmit the information 10 including the contents, the sender information, and the receiver information using a receiver's home telephone number including an area code. That is, when the sender inputs a receiver's telephone number and clicks a transmission button, the information 10 including the contents, the sender information, and the receiver information is transmitted to the data relay apparatus 200.

Then, the data relay apparatus 200 searches an IP address corresponding to the received receiver's telephone number. In this case, the telephone number of a telephone subscriber (receiver) and an IP address should be stored beforehand. When the stored telephone number is matched with the received receiver's telephone number, an IP address corresponding to the receiver's telephone number is searched, and the information 10 including the contents, the sender information, and the receiver information is transmitted to a host apparatus having the searched IP address.

For example, when a receiver's telephone number is 02-468-5698 (reference numeral 302) and an IP address corresponding to the receiver's telephone number is 168.219.191.54 (reference numeral 304), the information 10 including the contents, the receiver information, and the sender information is transmitted to a host apparatus 20 having the IP address. The contents may be translucently displayed on a portion of the screen of the host apparatus 20 in an OSD format, and the user (receiver) may operate the contents using various methods including a method of using a remote controller. That is, the contents may include moving pictures, images, and text messages, and the user can play back the moving picture or check the text message.

Therefore, this exemplary embodiment can provide various contents to the user, unlike the related art that displays only the text message. Even when the user has a cellular phone or the cellular phone is turned off, the user can view contents transmitted by the sender using the television, without using the cellular phone.

When the area code of a received telephone number cannot be processed by the data relay apparatus 200, the information 10 including the contents, sender information, and receiver information can be transmitted to a data relay apparatus 200 in another base station. The information 10 including the contents, the sender information, and the receiver information may be stored in the buffering unit 245.

Figure 4:
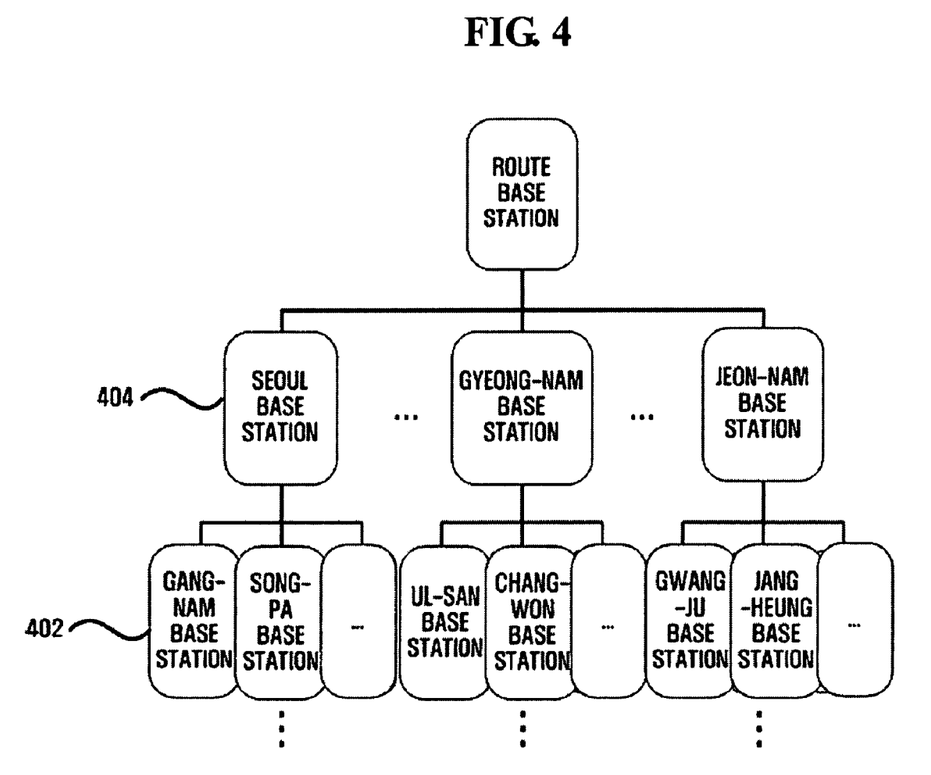
FIG. 4 is a diagram illustrating a tree structure of base stations each having the data relay apparatus according to the exemplary embodiment of the invention.

FIG. 4 is a diagram illustrating a tree structure of the base stations each having the data relay apparatus 200 according to the exemplary embodiment of the invention.

For example, it is assumed that, when sender information, receiver information, and contents are transmitted to the data relay apparatus of a Gangnam base station 402, the data relay apparatus 200 of the Gangnam base station 402 cannot process an area code of a receiver's telephone number included in the received information.

In this case, the data relay apparatus 200 of the Gangnam base station 402 may transmit the sender information, the receiver information, and the content to a Seoul base station 404, which is a host base station closest to the Gangnam base station 402.

The data relay apparatus 200 of the Seoul base station 404 determines whether the area code (or a receiver's telephone number) can be processed. When the data relay apparatus 200 of the Seoul base station 404 cannot process the area code, it may retransmit the sender information, the receiver information, and the contents to a host base station or another base station capable of processing the sender information, the receiver information, and the contents.

When information that the sender wants to transmit is normally transmitted to a host apparatus of the receiver through the above-mentioned procedure, a message for the result of the transmission may be transmitted to a sender's mobile communication terminal.

Figure 5:
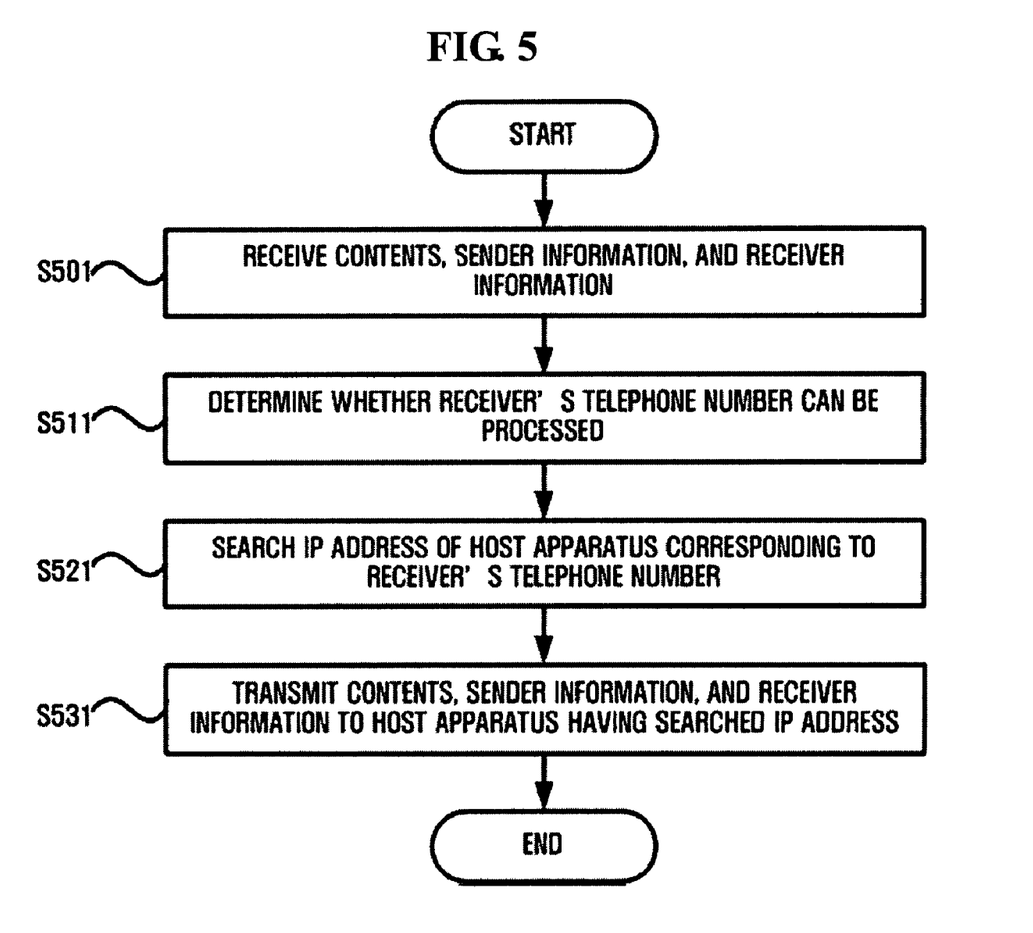
FIG. 5 is a flowchart illustrating a data relay method using a telephone number according to an exemplary embodiment of the invention.

FIG. 5 is a flowchart illustrating a data relay method using a telephone number according to an exemplary embodiment of the invention.

The receiving unit 210 receives predetermined information from a transmitter side. For example, the receiving unit 210 receives contents, sender information, and receiver information from a sender's mobile communication terminal (S501). The receiver information may include a receiver's name and a receiver's telephone number. In addition, the receiver's telephone number may be a receiver's (home) telephone number starting from an area code.

Then, the control unit 220 determines whether the received receiver's telephone number can be processed (S511). The data relay apparatus 200 can check whether an area code of the receiver's telephone number can be processed. When the area code cannot be processed, the control unit 220 may transmit the contents, the sender information, and the receiver information to a host data relay apparatus 200 or another data relay apparatus 200 capable of processing the area code, which has been described in detail with reference to FIG. 4.

When the area code can be processed, the searching unit 230 searches an IP address of a host apparatus corresponding to the receiver's telephone number (S521).

Then, the output unit 250 transmits information transmitted from the sender (for example, the contents, receiver information, and sender information) to a host apparatus having the searched IP address (S531).

If information that the sender wants to transmit (for example, the contents, the receiver information, and the sender information) is not normally transmitted to the host apparatus, the control unit 220 may control the buffering unit 245 to temporarily store the information and retransmit the information according to a TTL. In addition, the control unit 220 may notify a sender's mobile communication terminal whether information that the sender wants to transmit is normally transmitted to the host apparatus.

Although exemplary embodiments of the present invention have been described, it will be apparent to those skilled in the art that various modifications and changes may be made thereto without departing from the scope and spirit of the invention. Therefore, it should be understood that the above exemplary embodiments are not limitative, but illustrative in all aspects.

As described above, according to the data relay apparatus and method using a telephone number according to the exemplary embodiments of the invention, a sender can transmit, for example, various contents, sender information, and receiver information to a host apparatus of the receiver using a receiver's telephone number.

What is claimed is:

1. A data relay apparatus comprising:
a receiving unit which receives information comprising contents, sender information and receiver information generated by a mobile communication terminal from the mobile communication terminal;
a searching unit which searches for an Internet Protocol (IP) address of a host apparatus corresponding to a telephone number included in the receiver information received from the mobile communication terminal;
a storage unit which stores a single mapping table which includes the telephone number and the IP address mapped to each other; and
an output unit which outputs at least the contents transmitted from the mobile communication terminal to the host apparatus having the searched IP address.

2. The data relay apparatus of claim 1, wherein the telephone number comprises an area code and the searching unit utilizes the area code to search for the IP address.

3. The data relay apparatus of claim 1, further comprising:
a control unit which determines whether an area code of the telephone number can be processed.

4. The data relay apparatus of claim 3, wherein, if the control unit determines that the area code cannot be processed, the control unit transmits the information transmitted from the mobile communication terminal to another data relay apparatus capable of processing the area code.

5. The data relay apparatus of claim 3, wherein the control unit determines whether an area code of the telephone number can be processed by analyzing area codes of telephone numbers included in the single mapping table, and determining whether the area code of the telephone number is present in the single mapping table.

6. The data relay apparatus of claim 1, wherein the host apparatus includes an Internet Protocol Television.

7. The data relay apparatus of claim 1, wherein at least the contents transmitted from the mobile communication terminal is transmitted to the host apparatus using a transmission control protocol/Internet protocol or a user datagram protocol.

8. The data relay apparatus of claim 1, further comprising:
a buffering unit which temporarily stores the information transmitted from the mobile communication terminal if the information transmitted from the mobile communication terminal is not successfully transmitted to the host apparatus after a first transmission attempt made by the mobile communication terminal, and attempts to retransmit the information by a threshold value according to a time to live.

9. The data relay apparatus of claim 1, wherein the contents comprise at least one of text, images, audio, and video.

10. A data relay method comprising:
receiving information comprising contents, sender information and receiver information generated by a mobile communication terminal from the mobile communication terminal;
searching for an Internet Protocol (IP) address of a host apparatus corresponding to a telephone number included in the receiver information received from the mobile communication terminal;
storing a single mapping table comprising the telephone number and the IP address mapped to each other; and
outputting at least the contents transmitted from the mobile communication terminal to the host apparatus having the searched IP address.

11. The data relay method of claim 10, wherein the telephone number comprises an area code and the searching utilizes the area code.

12. The data relay method of claim 11, further comprising:
determining whether an area code of the telephone number can be processed.

13. The data relay method of claim 12, further comprising, if it is determined that the area code cannot be processed, transmitting the information transmitted from the mobile communication terminal to another data relay apparatus capable of processing the area code.

14. The data relay method of claim 12, wherein the determining whether the area code of the telephone number can be processed comprises analyzing area codes of telephone numbers included in the single mapping table, and determining whether the area code of the telephone number is present in the single mapping table.

15. The data relay method of claim 10, wherein the host apparatus includes an Internet Protocol Television.

16. The data relay method of claim 10, wherein at least the contents transmitted from the mobile communication terminal is transmitted to the host apparatus using a transmission control protocol/Internet protocol or a user datagram protocol.

17. The data relay method of claim 10, further comprising:
temporarily storing the information transmitted from the mobile communication terminal if the information transmitted from the mobile communication terminal is not successfully transmitted to the host apparatus after a first transmission attempt made by the mobile communication terminal, and attempting to retransmit the information by a threshold value according to a time to live.

18. The data relay method of claim 10, wherein the contents comprise at least one of text, images, audio, and video.

19. A data relay system comprising:
a mobile communication terminal which generates and transmits information comprising contents, sender information and receiver information;
a base transceiver station comprising:
a receiving unit which receives the information from the mobile communication terminal;
a searching unit which searches for an Internet Protocol (IP) address of a host apparatus corresponding to a telephone number included in the receiver information received from the mobile communication terminal; a storage unit which stores a single mapping table which includes the telephone number and the IP address mapped to each other; and
an output unit which outputs at least the contents transmitted from the mobile communication terminal to the host apparatus having the searched IP address; and
the host apparatus which receives at least the contents from the base transceiver and displays at least the contents on a screen of the host apparatus.

20. The data relay system of claim 19, wherein the contents is at least one of text messages, images, audio, and video generated by the mobile communication terminal through a user input operation and is distinct from the sender information and the receiver information.

21. The data relay system of claim 20, wherein the host apparatus comprises a remote control which operates the contents displayed on the screen according to an input command.

22. The data relay system of claim 19, wherein the contents is at least one of images, audio, and video generated by the mobile communication terminal through a user input operation.

23. The data relay system of claim 19, wherein the base transceiver station further comprises a control unit which determines whether an area code of the telephone number can be processed by the base transceiver station, and if the control unit determines that the area code can be processed, the searching unit searches for the IP address of the host apparatus corresponding to the telephone number included in the receiver information, and if the control unit determines that the area code cannot be processed, the control unit transmits the information transmitted from the mobile communication terminal to another base transceiver station capable of processing the area code.

* * * * *